(12) United States Patent
Dehmlow (10) Patent No.: US 6,359,669 B1
(45) Date of Patent: Mar. 19, 2002

(54) FLAT PANEL DISPLAYS HAVING AN EDGE TEXTURE

(75) Inventor: Brian P. Dehmlow, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/398,848

(22) Filed: Sep. 17, 1999

(51) Int. Cl.$^7$ ...................... G02F 1/1335; G02F 1/1333
(52) U.S. Cl. ........................... 349/62; 349/110; 349/112
(58) Field of Search .............................. 349/9, 10, 112, 349/113, 110, 73, 84, 62; 340/324; 359/3

(56) References Cited

U.S. PATENT DOCUMENTS

| | | | |
|---|---|---|---|
| 3,972,040 A | * 7/1976 | Hilsum et al. | 340/324 |
| 4,467,325 A | 8/1984 | Lustig | 340/794 |
| 5,015,912 A | 5/1991 | Spindt et al. | 313/495 |
| 5,083,058 A | 1/1992 | Nonomura et al. | 313/482 |
| 5,107,534 A | 4/1992 | Freyre | 385/22 |
| 5,315,417 A | * 5/1994 | Moss et al. | 359/3 |
| 5,457,356 A | 10/1995 | Parodoa | 313/505 |
| 5,626,991 A | 5/1997 | Hugle | 430/1 |
| 5,648,860 A | * 7/1997 | Ooi et al. | 349/10 |
| 5,739,180 A | 4/1998 | Taylor-Smith | 523/203 |
| 5,875,011 A | 2/1999 | Pierson et al. | 349/73 |
| 5,959,704 A | * 9/1999 | Suzuki et al. | 349/9 |

FOREIGN PATENT DOCUMENTS

JP 11202112 A * 7/1999

OTHER PUBLICATIONS

Dehmlow, Brian P. et al., Reflection–Mode Diffraction And Matrix Displays, Proceedings of SPIE, vol. 3363, Apr. 1998.
Hecht, E. et al., Optics, Massachsetts, Addison–Wesley Publishing Co., 1997, p. 354–365.
Born, M. et al., Principles of Optics; Electromagnetic Theory of Propagation, Interference and Diffraction of Light, Oxford, Pergamon Press, 1980, pp. 401–415.
Ditchburn, R. W., Light, New York, Dover Publications, Inc., 1991, pp. 174–190.
Photometric and Colorimetric Measurements Procedures For Airborne Direct View CRT Displays, Society of Automotive Engineers, ARP1782, Jan. 9, 1989.
Photometric and Colorimetric Measurement Procedures For Airborne Flat Panel Displays, Society of Automotive Engineers, ARP4260, Rev. B, Apr. 24, 1998.
Lighting, Aircraft Interior, Night Vision Imaging System (NVIS) Compatible, Department of Defense, MIL–L–85762A, Aug. 26, 1988.

* cited by examiner

*Primary Examiner*—William L. Sikes
*Assistant Examiner*—Julie Ngo
(74) *Attorney, Agent, or Firm*—Nathan O. Jensen; Kyle Eppele (57) ABSTRACT

A method and apparatus for minimizing diffraction effects on flat panel displays. The flat panel display includes a plurality of display elements, each display element including a first structural feature having an edge and a second structural feature disposed on the first structural feature. The edge of the first structural feature causes incident rays from a point light source to generate diffraction effects due to the Fresnel reflectance difference in the boundary between the first and second structural features. The display further includes an edge texture on the edge of the first structural feature to minimize the diffraction effects into a more diffused diffraction pattern.

20 Claims, 9 Drawing Sheets

FLAT PANEL DISPLAYS HAVING AN EDGE TEXTURE

FIELD OF THE INVENTION

The invention relates generally to flat panel displays. More particularly, the present invention relates to a method and apparatus for minimizing diffraction effects in flat panel displays.

BACKGROUND OF THE INVENTION

Flat panel displays enjoy wide appeal as computer screens, television screens, electronic game displays, avionics or vehicular displays, and as displays in a variety of other applications because of their light weight, small footprint, relatively sharp resolution, and low power consumption. Unfortunately, flat panel displays can exhibit undesirable visual effects previously unseen with other types of display devices. One such visual effect is the presence of bright bands, or multiple images, surrounding the mirror image of a small, non-diffused, intense light source, such as the sun.

Figure 1:
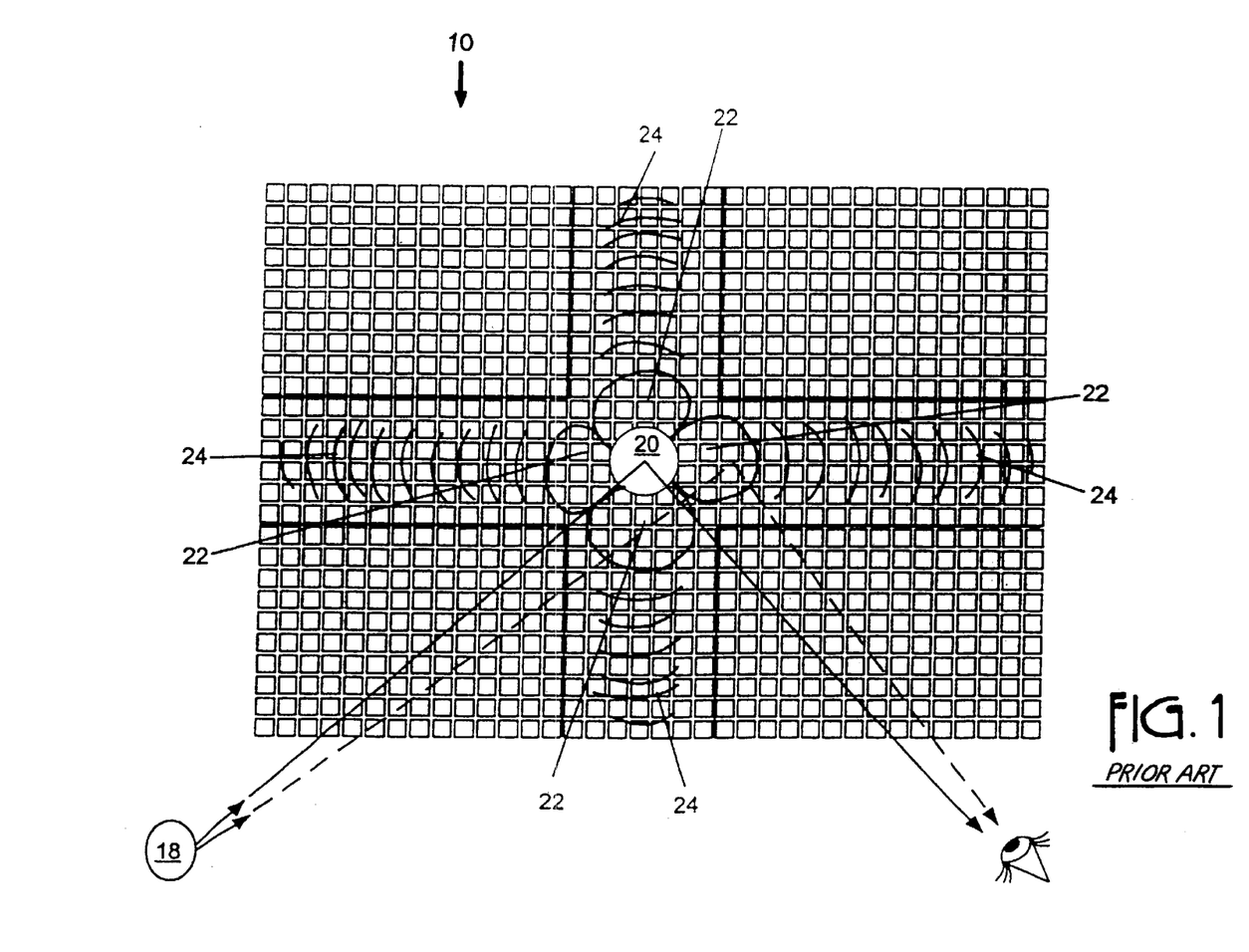
FIG. 1 is a front view of a flat panel display showing the diffraction pattern generated by a point light source.

The visual anomalies, as shown on a flat panel display 10 in FIG. 1, generally lack well-defined features and instead, appear as broad, orthogonal bands 24 extending vertically and horizontally away from the mirror or specular image 20 of the small, intense light source 18 and may also include multiple secondary images 22 of the light source 18. Bands 24 and the secondary images 22, collectively referred to as a diffraction pattern, always surround the specular image 20 of the light source 18, with the diffraction pattern being brightest near the specular image 20.

For example, in the case of flat panel display 10 being a liquid crystal display (LCD) 240 (see FIG. 2), it is the sharp boundary between a black matrix 244 and a color filter 246 that is the primary source of the diffraction pattern. An incident ray 80 impinging on a region of LCD 240 where no black matrix 244 is present experiences Fresnel reflectance and transmittance to generate a reflection ray 82 and a transmission ray 84, respectively. At regions of black matrix 244 away from its edges, an incident ray 86 will experience Fresnel reflectance to generate a reflection ray 88, but no transmission ray because black matrix 244 is optically opaque. Thus all points on LCD 240 not on an edge of black matrix 244 lead to Fresnel reflectance that is specular because only a small refractive index difference exists between a front substrate 242 and the color filter 246.

Figure 2:
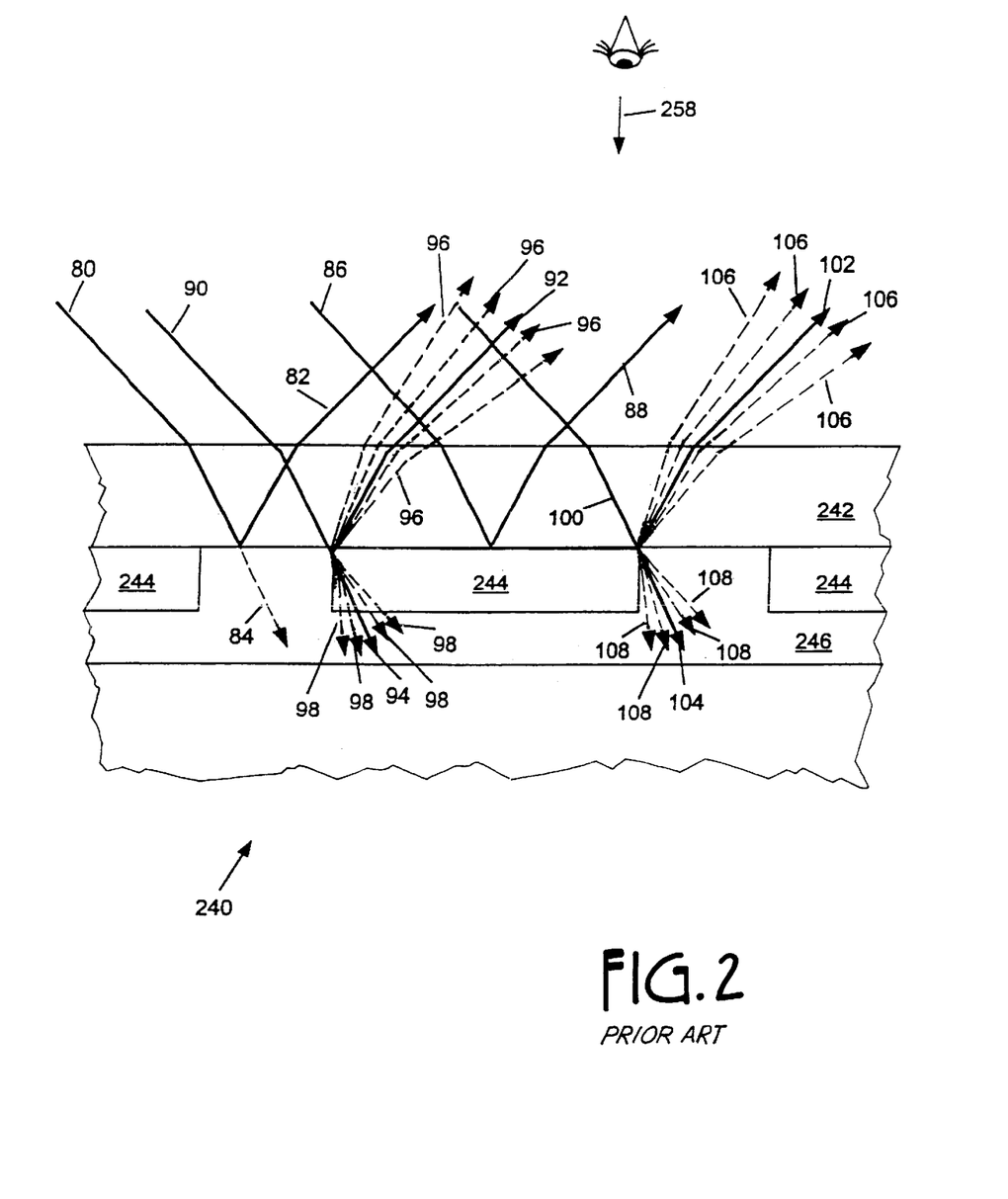
FIG. 2 is a partial cross-sectional view of the flat panel display of FIG. 1, showing light ray trajectories from the point light source.

In contrast, incident rays 90, 100 impinging on an edge of black matrix 244 leads to Fresnel reflectance and transmittance to generate respectively reflection rays 92, 102 and transmission rays 94, 104 as described above, but also reflection-mode diffraction rays 96, 106 and transmission-mode diffraction rays 98, 108. It is at these edges that the difference in the Fresnel reflectance at the boundary of the black matrix 244 and color filter 246 leads to the diffraction pattern. Specifically, it is the diffraction rays exiting the front of LCD 240, e.g., reflection-mode diffraction rays 96, 106, that are problematic since LCD 240 is viewed from a viewing direction 258.

Typically, the appearance of the diffraction pattern, i.e., intensity, shape, color, etc., is directly correlated to the physical construction of the flat panel display, and not its operation. For example, displays of the same design exhibit similar diffraction patterns, while displays of a different design may exhibit a significantly different diffraction pattern. Similarly, one display design may generate predominantly chromatic diffraction patterns, while other display designs may lead to strong spectral dispersion with repeating bands. Furthermore, the brightness of the diffraction pattern may vary according to the display design.

In addition to the sun, other small, intense light sources (also referred to as point sources) such as incandescent or arc lamps can also generate diffraction patterns on flat panel displays. Basically, light sources with limited angular size are potential diffraction pattern generators, while spatially extended sources like fluorescent or diffused lamps or sunlight reflecting from diffuse surfaces such as clothing or clouds do not generate diffraction patterns as shown in FIG. 1. This is not to say that spatially extended sources, also referred to as area sources, do not produce diffraction patterns. Instead, each point on the area source generates its own diffraction pattern with a slight lateral displacement thereof. Then, when the diffraction patterns from all the points visually superimpose, the peaks in each of the diffraction patterns merge to form secondary images of the area source. Hence, area sources do not produce significant diffraction effects as observed with point sources such as the sun.

Moreover, it has been observed that changing the orientation of the flat panel display and/or viewing direction does not eliminate the diffraction pattern. For example, when the flat panel display is rotated relative to the viewer and the light source, the diffraction pattern also rotates with the display. Similarly, when the viewer moves relative to the display and light source, the diffraction pattern will also shift in position on the display. Hence, if the diffraction pattern is bright enough over a relevant portion of the display, the readability of the information presented by that portion of the display will be impaired. Display readability degradation results in increased reading time, decreased reading accuracy, and viewer discomfort due to eyestrain, and even possibly headache and nausea. Diffraction patterns are particularly problematic in display applications where the positions of the display, viewer, and light source are not independently controllable such as in avionics or vehicle applications. In such situations, for example, in modern fighter jet cockpits with large transparent canopies, the operator (i.e., the pilot or driver) may experience performance degradations due to increased reading time or decreased reading accuracy due to the diffraction pattern.

Thus, there is a need for an apparatus and method for minimizing diffraction effects on flat panel displays. Moreover, given the complex structure of flat panel displays, there is a need for the apparatus and method to minimize such diffraction effects without adding undue weight to the displays or requiring extensive changes to their physical construction thereby negating desirable performance parameters of existing displays. Still further, there is a need for the apparatus and method to be easily modifiable for implementation in various types of flat panel displays.

SUMMARY OF THE INVENTION

One embodiment of the invention relates to a flat panel display system having a front viewing surface. The system includes a display layer, a first electrode, and a second electrode. At least one of the display layer, the first electrode, and the second electrode includes an edge having an edge texture, wherein the edge texture minimizes diffraction effects visible on the front viewing surface of the system caused by a point light source.

Another embodiment of the invention relates to a flat panel display system having a front viewing surface. The system includes a black matrix, a first electrode, a second electrode, a color filter, and an electrical structure. At least one of the black matrix, the first electrode, the second electrode, the color filter, and the electrical structure includes an edge having an edge texture, wherein the edge texture minimizes diffraction effects visible on the front viewing surface of the system caused by a point light source.

Another embodiment of the invention relates to a flat panel display including a plurality of display elements, each display element having a first structural feature with an edge and a second structural feature disposed on the first structural feature, wherein incident rays from a point light source incident on the edge of the first structural feature and then the boundary of the second structural feature generates undesirable diffraction effects. The display further includes means for minimizing the undesirable diffraction effects. In one preferred embodiment, the means for minimizing the undesirable diffraction effects includes an edge texture included on the edge of the first structural feature. In still another preferred embodiment, the edge texture includes a profile of the edge texture selected from a group including a fractal profile, a discontinuous curved profile, a continuous curved profile, a random profile, a piecewise linear profile, a non-linear profile, and a profile configured to decrease the diffraction effects caused by a smooth surface of the edge.

Still another embodiment of the invention relates to a method for minimizing diffraction effects on a flat panel display. The method includes generating an edge texture on an edge of a structural feature of a display element of the display, wherein the edge minimizes diffraction effects when exposed to a point light source.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 3:
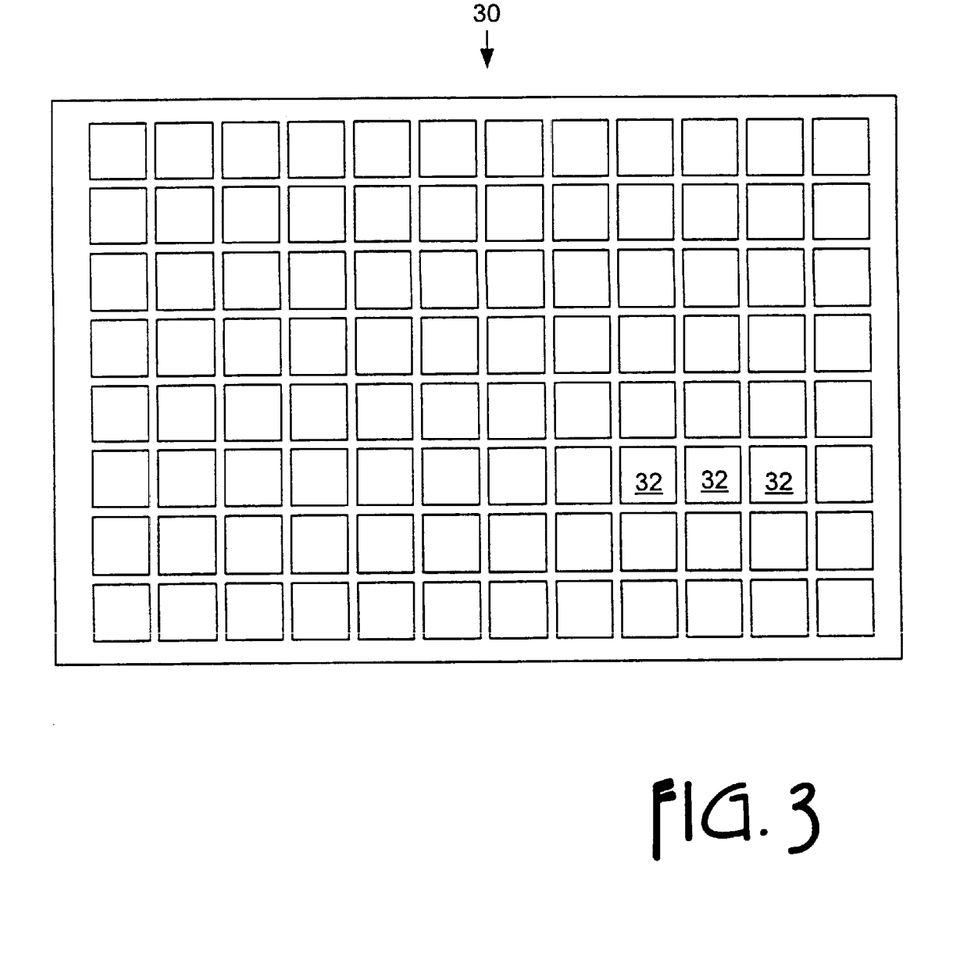
FIG. 3 is a schematic diagram of a front viewing surface of a flat panel display in accordance with the present invention, the diagram showing an array of display elements.

Referring to FIG. 3, there is shown a flat panel display 30 of the present invention comprised of an array of display elements 32 arranged in an evenly spaced grid pattern for forming a composite image thereon. Alternatively, elements 32 may be arranged in a staggered grid pattern resembling a brick wall (not shown). Although elements 32 are shown square shaped, it should be understood that elements 32 may be any regular geometric shape, such as rectangles or any arbitrary shape as is convenient. Preferably the distance between adjacent display elements 32 is approximately 20 microns and each of the display elements 32 has dimensions of approximately 70 microns by 40 microns.

Figure 4:
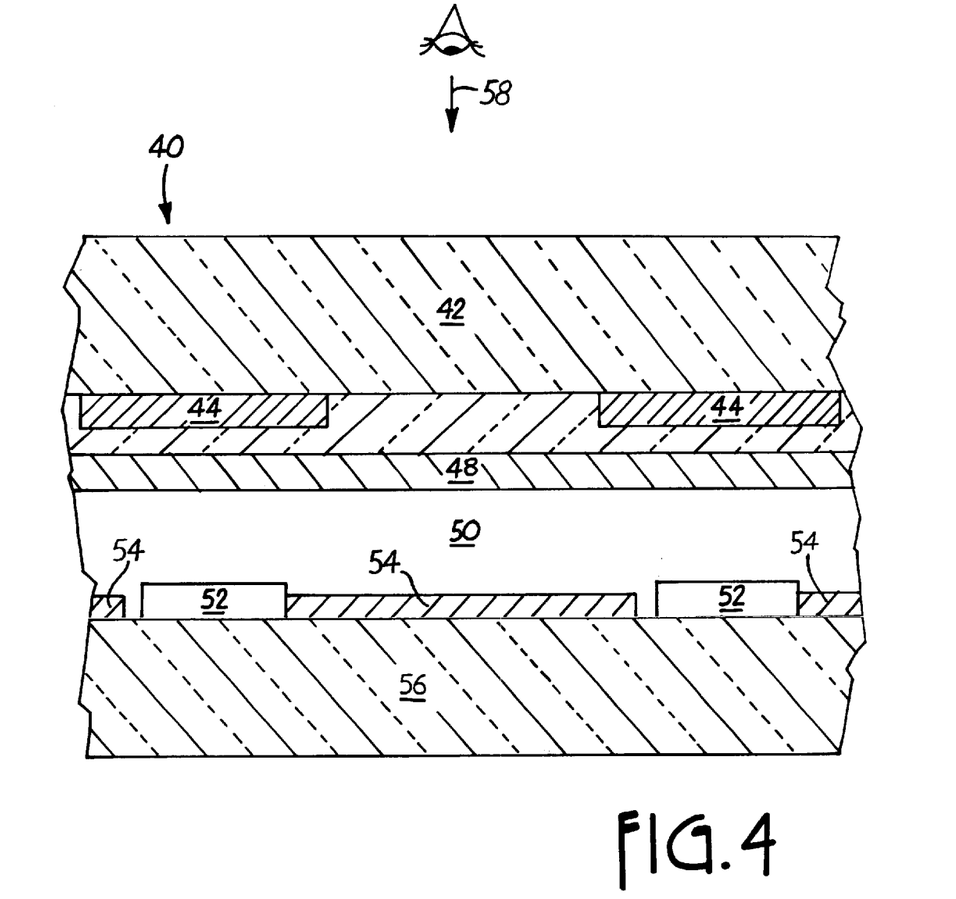
FIG. 4 is a cross-sectional view of an embodiment of the flat panel display of FIG. 3, shown as a liquid crystal display.
Figure 5:
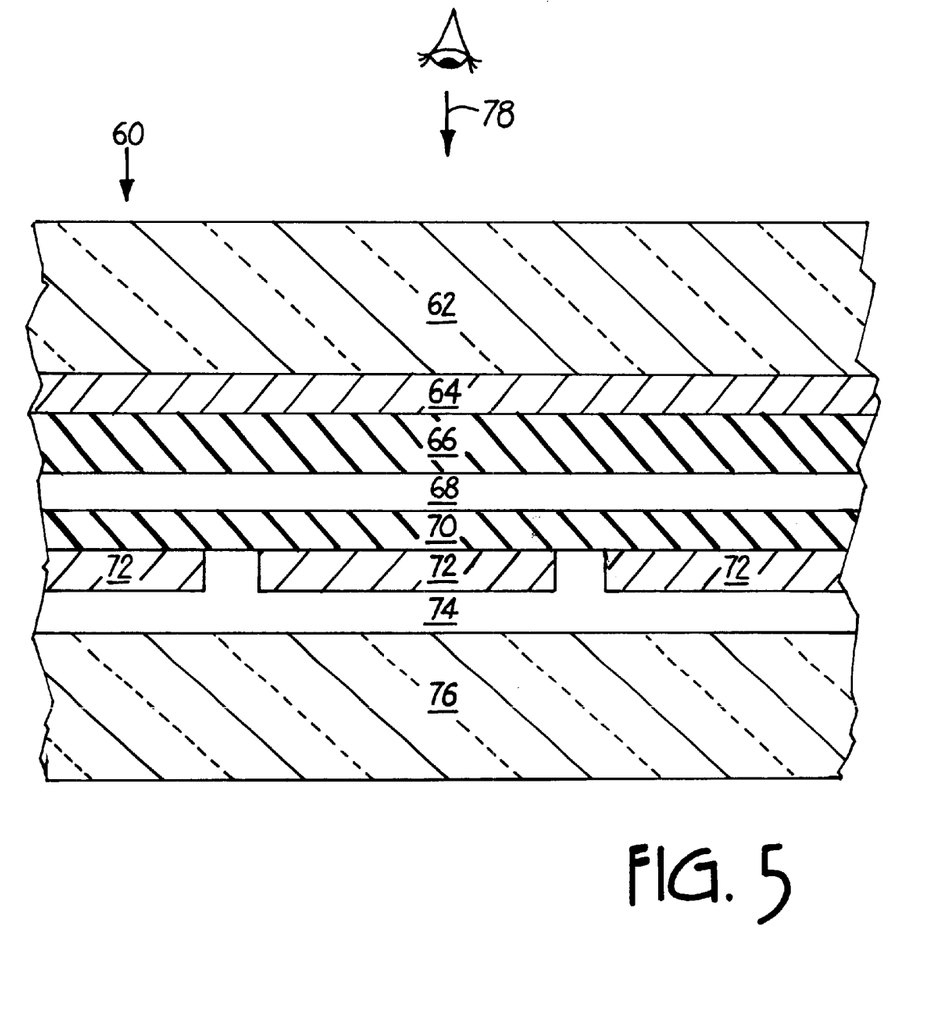
FIG. 5 is a cross-sectional view of another embodiment of the flat panel display of FIG. 3, shown as an electroluminescent display.

Each display element 32, in turn, is comprised of numerous structural layers, or structural features, such as electrical conductors or devices, and emitting or transmitting layers (see FIGS. 4 and 5). These structural features are usually defined by a geometry having long, straight edges because such a geometry enhances yield in many fabrication processes and most efficiently uses the available display area. Thus, flat panel display 30, when viewed from the front thereto, contains regularly spaced, parallel repetition of predominantly horizontal and vertical edges from one or more structural features of each element 32.

Flat panel display 30 includes display devices having a relatively high mirror reflection component such as, but not limited to, a liquid crystal display (LCD), and electro luminescent (EL) display, a plasma display, a deformable— mirror display, or other light-transmissive or light-emitting displays. In one embodiment, FIG. 4 shows a partial cross-section of a LCD 40, to be viewed from a viewing direction 58, including the structural features of a front substrate 42, a black matrix 44, a color filter 46, a common electrode 48, a liquid crystal cell 50, an electrical structure 52, a pixel electrode 54, and a rear substrate 56.

Front substrate 42 is closest to the viewer and the rear substrate 56 is disposed furthest from the viewer. Black matrix 44 is disposed on a major side of front substrate 42 opposite the viewer's side. Color filter 46 is disposed on black matrix 44, and common electrode 48 is disposed on color filter 46. Liquid crystal cell 50 is disposed on the common electrode 48, and electrical structure 52 and pixel electrode 54 are disposed on the liquid crystal cell 50. Finally, rear substrate 56 is disposed on electrical structures 52 and pixel electrode 54.

Front and rear substrates 42, 56 are preferably comprised of glass or other optically transparent and non-flexible material. Front and rear substrates 42, 56 may have dimensions approaching the size of the overall LCD 40, since they act as a "housing" or protective layers.

Black matrix 44 comprises an optically opaque material such that light incident on black matrix 44 will be absorbed or reflected back with no transmission therethrough. Preferably, black matrix 44 is a metal, metal oxide, or a combination of metal and metal oxide such as chrome, chrome oxide, or a combination of chrome and chrome oxide.

Color filter 46 comprises an optically transparent material. Preferably color filter 46 is a dyed or pigmented polymer such as acrylic.

Common electrode 48 includes a first major side surface and a second major side surface substantially perpendicular to the viewing direction 58, the first major side surface being closer to the black matrix 44 then the second major side surface. Common and pixel electrodes 48, 54 are comprised of a transparent conductive material such as indium tin oxide.

Liquid crystal cell 50, also referred to as a modulator or display layer, comprises liquid crystal molecules capable of different molecular orientations to modulate the transmitted optical polarization state in accordance with the absence or presence of an electric field applied across thereon.

Electrical structures 52 can comprise numerous electrical devices, preferably thin film transistors or conductors. Furthermore, each electrical structure 52 aligns with each black matrix 44 (as shown in FIG. 3) so that electrical structures 52 are not visible from viewing direction 58.

In another embodiment, there is also shown in FIG. 5 a partial cross-section of an electro luminescent (EL) display 60, to be viewed from a viewing direction 78, including the structural features of a front substrate 62, a row electrode 64, a first insulator layer 66, an emitter layer 68, a second insulator layer 70, a column electrode 72, an insulating layer 74, and a rear substrate 76.

Front substrate 62 is closest to the viewer and the rear substrate 76 is disposed farthest from the viewer. Row electrode 64 is disposed on a region side of front substrate 62 opposite the viewer's side. First insulator layer 66 is disposed on row electrode 64, and the emitter layer 68 is disposed on the first insulator layer 66. Second insulator layer 70 is disposed on emitter layer 68, and the column electrode 72 is disposed on the second insulator layer 70. Insulating layer 74 is disposed on column electrode 72, and the rear substrate 76 is disposed on insulating layer 74.

Front and rear substrates 62, 76 are preferably comprised of glass or other optically transparent material. Front and rear substrates 62, 76 may have dimensions approaching the size of the overall EL display 60, since they act as a "housing" or protective layers.

Row electrodes 64 are comprised of a transparent conductive material such as indium tin oxide. Column electrodes 72 are comprised of a conductive material such as aluminum. First and second insulator layers 66, 70 are comprised of an amorphous or crystalline inorganic material such as yttrium oxide, aluminum oxide, or silicon nitride.

Emitter layer 68, also referred to as a display layer, includes a first major side surface and a second major side surface substantially perpendicular to the viewing direction 78. Emitter layer 68 comprises a light emittive material responsive to an applied voltage. Preferably emitter layer 68 is a solid inorganic phosphor or organic light-emitting polymer. More preferably, emitter layer 68 is a thin film and includes patterning on at least one major side thereof. Insulating layer 74 comprises a moisture impermeable material, preferably a fluorocarbon-based polymer or silicone-based oil.

It should be understood that the present invention is not limited to flat panel displays configured as in FIGS. 4 and 5. Instead, for example, LCD 40 may include additional structural features such as compensators, polarizers, more than one liquid crystal layers, backlight, etc. Similarly, EL display 60 may include additional structural features such as thin film transistors and other electrical structures, and multiple rows and/or columns of electrodes for each display element. Moreover, the ordering of the structural features within each display may be modified to facilitate certain performance parameters or fabrication processes.

When a viewer and a small, intense light source (i.e., a point light source), such as the sun, are located on the same side of the flat panel display 30, i.e., the front of the display, a diffraction pattern is generated on that same side of the display 30 from certain edges of the structural features. This diffraction pattern, more specifically a reflection-mode diffraction effect, is caused by abrupt changes in the Fresnel reflection coefficients. Reflection-mode diffraction effect, such as shown in FIG. 1, occurs at every material boundary where the Fresnel reflectance is not identical on both sides of the boundary.

Thus, each edge of each structural feature visible or "exposed" when flat panel display 30 is viewed from its front viewing surface and which has this material boundary condition can cause reflection-mode diffraction rays similar to rays 96, 106 (see FIG. 2), and thus the diffraction pattern. For LCD 40 in FIG. 4, it is the edges corresponding to black matrix 44 and/or color filter 46 that is the primary source of reflection-mode diffraction. For EL display 60 in FIG. 5, it is the edges corresponding to the column electrodes 72, the emitter layer 68, and the row electrodes 64 that are the primary sources of reflection-mode diffraction.

It should be understood that if additional structural features are included in LCD 40 or EL display 60, those structural features having visible edges and material boundary where the Fresnel reflectance is not identical on both sides of the boundary can also be sources of diffraction patterns. Similarly, although not shown, for other types of flat panel displays having edges of one or more structural features visible from the viewing direction, and these structural features having a material boundary where the Fresnel reflectance is not identical on both sides of the boundary, will be sources of diffraction patterns.

Undesirable diffraction patterns on flat panel displays can be minimized by decreasing the brightness of the diffraction rays, such as diffraction rays 96, 106 (FIG. 2), and/or by changing the azimuthal orientation of the diffraction rays. The brightness of the diffraction rays are determined by the reflectance differences and lengths of the structural feature edges responsible for the diffraction rays. The azimuths of the diffraction rays are determined by the edge orientation, wherein diffraction rays from predominantly horizontal and vertical edges have their azimuthal orientation in planes perpendicular to these edges. Therefore, flat panel display 30 includes very small or microscopic facets or curves, i.e., textures, to these edges within the flat panel display 30.

The textures transform each diffraction-ray causing edge from a single, long diffraction source into multiple, short, discontinuous diffraction sources. Since the diffraction pattern brightness is partially determined by the edge length, each shorter edge becomes a weaker diffraction source. Moreover, each facet or curve diffracts rays into many different azimuthal planes rather than one diffraction azimuthal plane as in the case of the long straight edge.

For example, in the case of LCD 40 in FIG. 4, one or more edges of black matrix 44 and/or color filter 46 include the edge texture. In the case of EL display 60 in FIG. 5, one or more edges of row electrode 64, column electrode 72, and/or emitter layer 68 include the edge texture. It should be understood, however, that edge textures can be included on any structural feature within flat panel display 30 to control diffraction effects.

In addition to including the edge texture on any structural feature within flat panel display 30, the edge texture can be applied to any one or more edge of the diffraction causing structural feature. This edge can be horizontal, vertical, diagonal, straight, curved, etc. Moreover, the edge texture may be applied to an entire edge length, a portion of the edge length, on a corner intersecting two edge lengths, a portion of a major side surface of the structural feature, etc. Moreover, a structural feature may include one or more types of edge textures, perhaps a first edge texture along its vertical edges and a second edge texture (different from the first edge texture) along its horizontal edges. Alternatively, adjacent structural features may include different edge textures.

Figure 6:
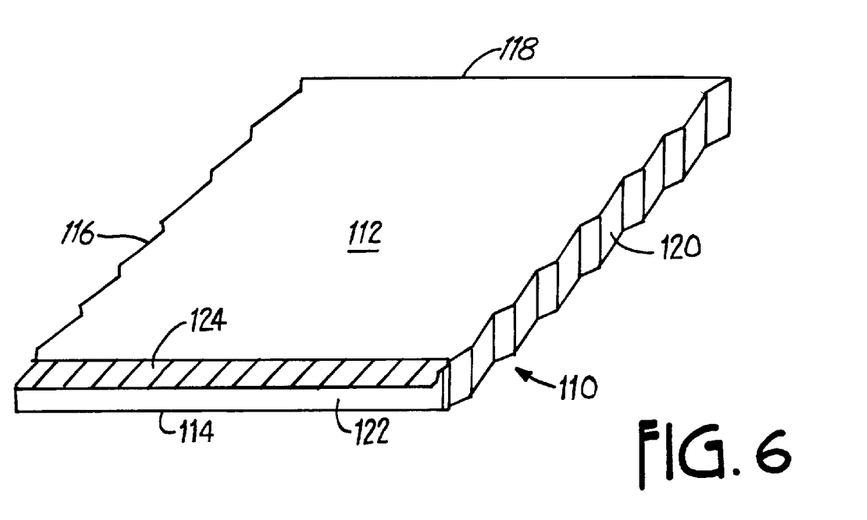
FIG. 6 is a perspective view of a structural feature of the flat panel display of FIG. 3, showing an edge texture thereon.
Figure 7:
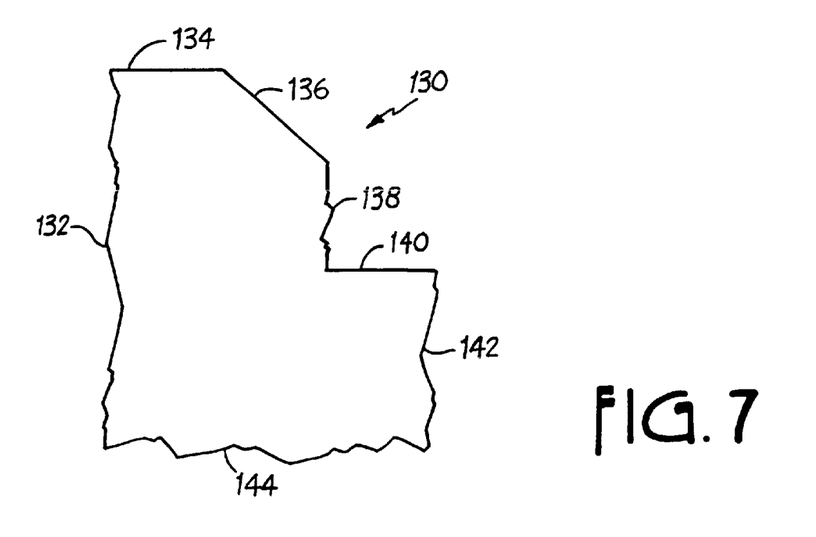
FIG. 7 is a front view of another structural feature of the flat panel display of FIG. 3, showing an edge texture thereon.
Figure 8:
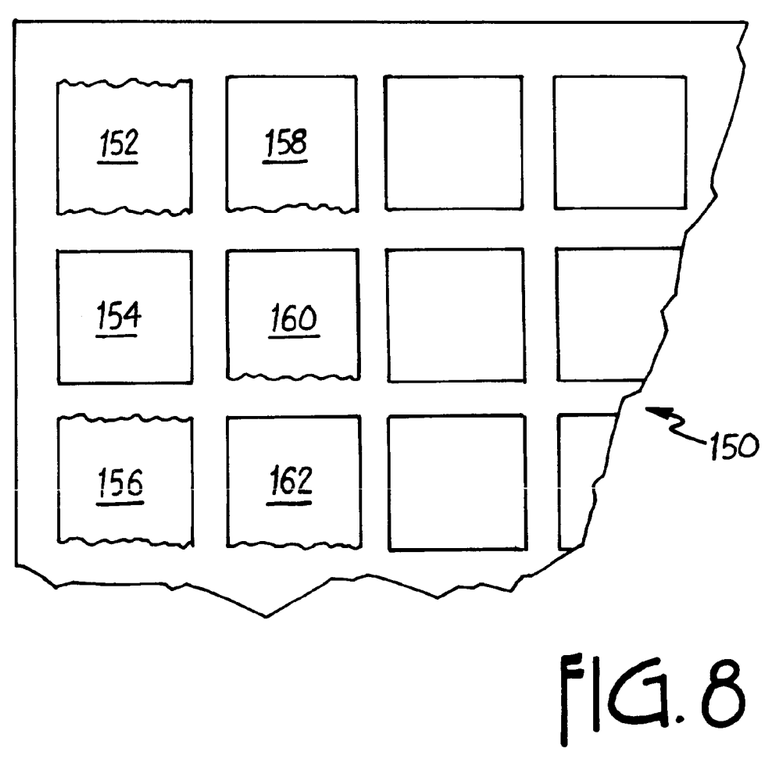
FIG. 8 is a partial front view of the flat panel display of FIG. 3, showing edge textures included on a plurality of adjacent structural features of the display elements.
Figure 9:
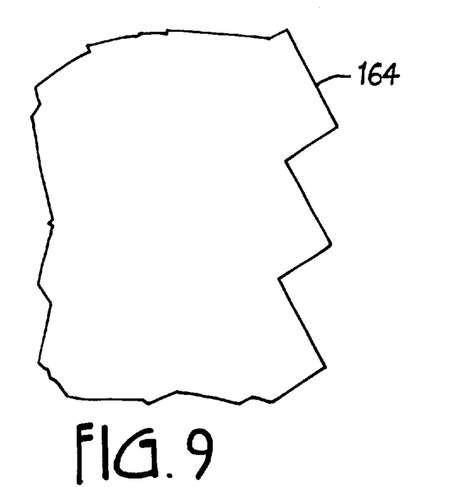
FIG. 9 is a partial front view of the structural feature of the flat panel display of FIG. 3, showing a first edge texture profile.
Figure 10:
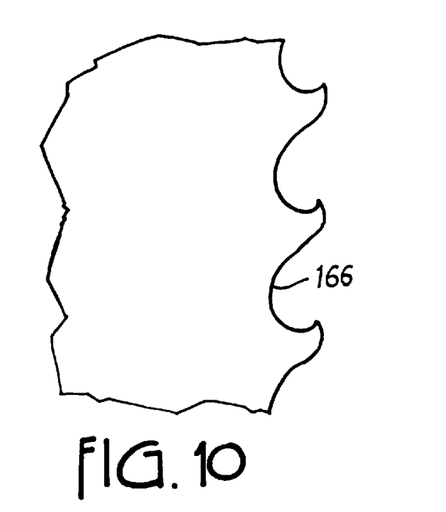
FIG. 10 is a partial front view of the structural feature of the flat panel display of FIG. 3, showing a second edge texture profile.
Figure 11:
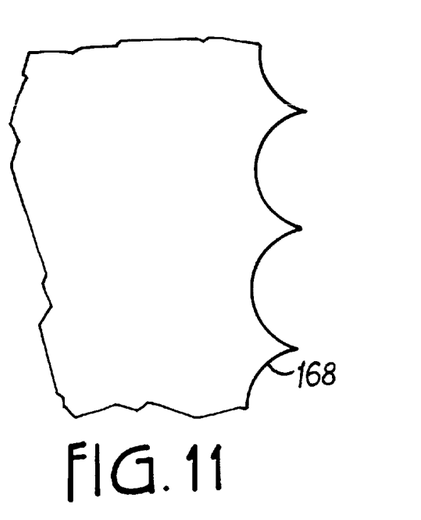
FIG. 11 is a partial front view of the structural feature of the flat panel display of FIG. 3, showing a third edge texture profile.
Figure 12:
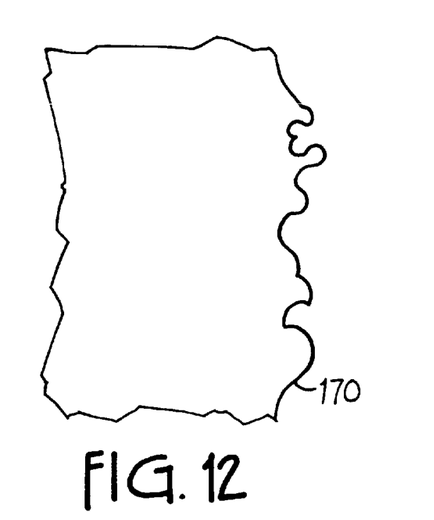
FIG. 12 is a partial front view of the structural feature of the flat panel display of FIG. 3, showing a fourth edge texture profile.
Figure 13:
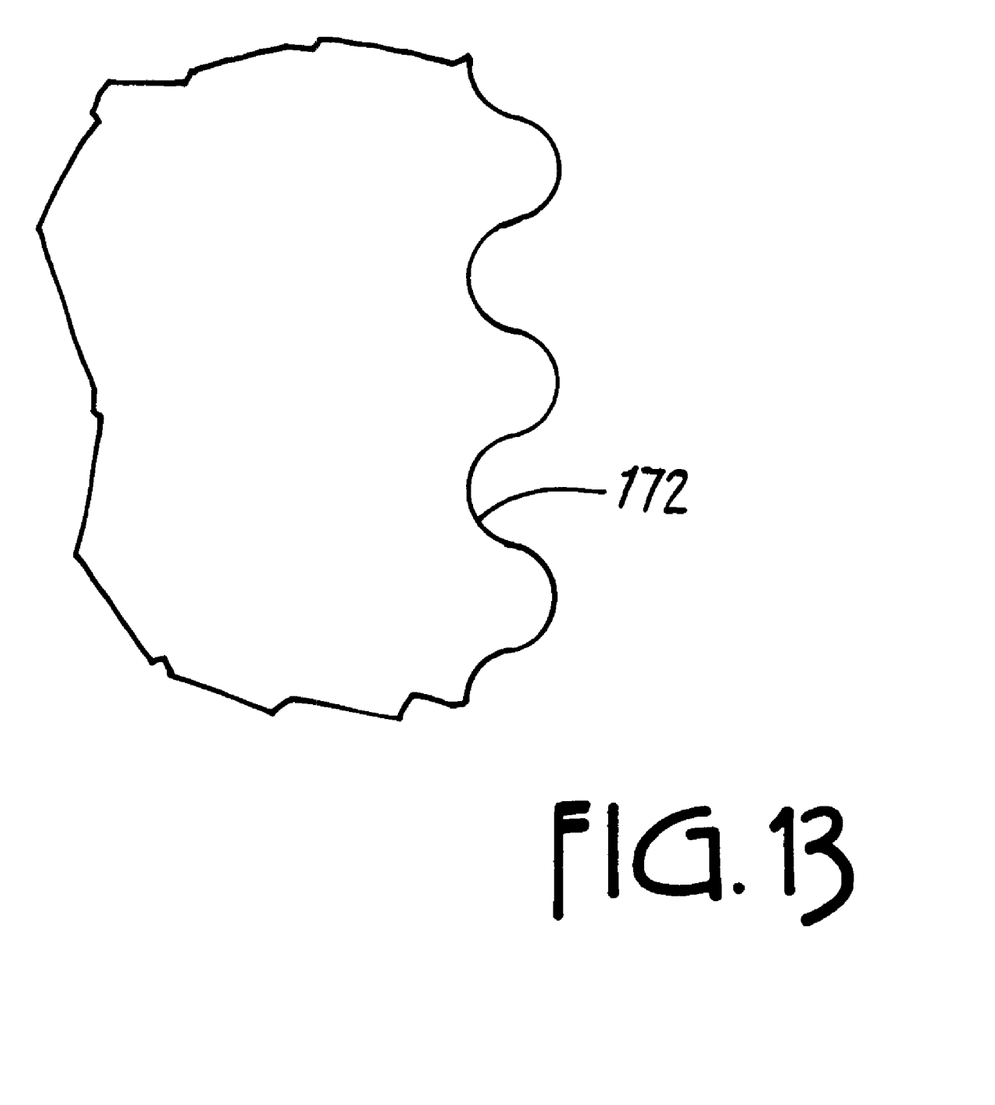
FIG. 13 is a partial front view of the structural feature of the flat panel display of FIG. 3, showing a fifth edge texture profile.

FIG. 6 shows a perspective view of a diffraction causing structural feature 110 of the flat panel display 30 including a first major side surface 112, a second major side surface 114, and a first, a second, a third, and a fourth edge 116, 118, 120, 122, respectively. Structural feature 110 includes two of its edge lengths textured, the first and third edges 116, 120. Structural feature 110 also includes a portion 124 of the first major side surface 112 textured. FIG. 7 shows a front view of an alternate diffraction causing structural feature 130 including a first, a second, a third, a fourth, a fifth, a sixth, and a seventh edge 132, 134, 136, 138, 140, 142, 144, respectively. Structural feature 130 includes an edge texture along the length of the first, sixth, and seventh edges 132, 142, 144, respectively. Structural feature 130 also includes an edge texture along a portion of the fourth edge 138. FIG. 8 shows a front view of a portion of a flat panel display 150 including visible structural features 152–162. As shown in FIG. 8, an edge texture is formed along alternating structural features, such as structural features 152, 156 (skipping structural feature 154); or along the same edge length of each adjacent structural features 158, 160, 162.

Many edge textures are possible, each with its own specific diffraction distribution. Diffraction distributions can be tailored to suit the diffraction effect minimization desired for a specific application, e.g., a certain type of flat panel display or certain display applications, by implementing the appropriate edge texture on the problematic structural features of the display. For example, when the edge texture is a smooth curve, the diffraction distribution will be a broad fan-like distribution. When the edge texture is a series of piecewise linear facets, the diffraction distribution will be distributed into a number of discrete planes at different azimuthal orientations. When the edge texture is a random pattern, the diffraction distribution will likewise be a random distribution, rather than the horizontal and/or vertical bands. Shown in FIGS. 9–13 are portions of structural features, each including a distinct edge texture. Profiles of edge textures, viewed from a direction substantially perpendicular to the major surface of the structural feature, include a piecewise linear profile 164, a fractal profile 166, a discontinuous curved profile 168, a random profile 170, and a continuous curved profile 172. Although not shown, the edge textures can also include a variety of other shapes, as long as the edge texture results in some decrease of the diffraction effect otherwise caused by a smooth edge of the structural feature.

Texture application on diffraction-causing edges of structural features can be accomplished without significantly changing the display's geometry, processing methods, yield, or percentage of active display area. During the typical course of display fabrication, in which structural features are created by successive deposition, masking, etching, cleaning, growing, etc. process steps similar to integrated circuit fabrication, the process step responsible for the edge geometry of the problematic structural feature can be slightly modified to include the edge texture. For example, in the case of LCD 40 in FIG. 4, black matrix 44 is typically formed by depositing the layer of metal and/or metal oxide over color filter 46; photo masking the layer with a mask having a pattern of the desired geometry for black matrix 44 (i.e., a grid-like pattern throughout the viewing surface of LCD 40); and then selectively etching this layer based on the mask pattern, achieving the desired geometry for black matrix 44. In order to include one or more edge textures to the edges of black matrix 44, the mask used for patterning black matrix 44 above would include a specific pattern of these desired edge texture geometries. Therefore, diffraction effect minimization can be implemented by substituting a different mask during typical display fabrication processes.

It should be apparent that there has been provided in accordance with one embodiment of the present invention minimization of diffraction effects in flat panel displays. While the embodiments illustrated in the FIGs. and described above are presently preferred, it should be understood that these embodiments are offered by way of example only. Accordingly, the invention is not limited to a particular embodiment, but extends to alternatives, modifications, and variations that nevertheless fall within the spirit and scope of the appended claims.

What is claimed is:

1. A flat panel display having a viewing surface, comprising:
   a plurality of display elements, each of the display elements including a first structural feature having a first edge substantially perpendicular to the viewing surface and a second structural feature having a second edge substantially perpendicular to the viewing surface, wherein the first and second edges are disposed next to each other to form a boundary; and
   means for diffusing reflection-mode diffraction light formed at the boundary, wherein the means for diffusing is included on at least one of the first and second edges, and the first and second structural features are at least one of a black matrix, a display layer, an electrode, and structures having non-identical Fresnel reflectances at the boundary.

2. The display of claim 1, wherein the means for diffusing is an edge texture.

3. The display of claim 2, wherein the edge texture includes a profile selected from at least one of a fractal profile, a discontinuous curved profile, a continuous curved profile, a random profile, a piecewise linear profile, a non-linear profile, and a profile configured to direct the reflection-mode diffraction light in two or more azimuthal orientations.

4. The display of claim 1, wherein the display is at least one of a liquid crystal display and an electroluminescent display.

5. The display of claim 1, wherein the reflection-mode diffraction light is caused by light emitted from a point light source incident on the display, the point light source located on the same side of the display as a viewer of the display.

6. A flat panel display system having a front viewing surface, comprising:
   an emitter layer having an emitter edge substantially perpendicular to the front viewing surface;
   a first electrode having a first electrode edge substantially perpendicular to the front viewing surface; and
   a second electrode having a second electrode edge substantially perpendicular to the front viewing surface, wherein the emitter layer is disposed between the first and second electrodes, and at least one of the emitter edge, the first electrode edge, and the second electrode edge includes an edge texture configured to direct reflection-mode diffraction light in two or more azimuthal directions, the reflection-mode diffraction light caused by light emitted from a point light source incident on the flat panel display system.

7. The flat panel display system of claim 6, wherein the emitter layer is comprised of at least one of a solid inorganic phosphor material and an organic light-emitting polymer material.

8. The flat panel display system of claim 6, wherein the edge texture has a profile selected from at least one of a fractal profile, a discontinuous curved profile, a continuous curved profile, a piecewise linear profile, a random profile, a non-linear profile, and a profile configured to direct the reflection-mode diffraction light in two or more azimuthal orientations.

9. The flat panel display system of claim 8, wherein the emitter layer includes an emitter major surface substantially parallel to the front viewing surface and at least a portion of the emitter major surface including the edge texture.

10. The flat panel display system of claim 8, wherein the first electrode includes a first electrode major surface substantially parallel to the front viewing surface and at least a portion of the first electrode major surface includes the edge texture.

11. The flat panel display system of claim 8, wherein the second electrode includes a second electrode major surface substantially parallel to the front viewing surface and at least a portion of the second electrode major surface includes the edge texture.

12. The flat panel display system of claim 6, wherein the emitter layer, the first electrode, and the second electrode comprise a display element and the flat panel display system is comprised of a plurality of display elements.

13. A flat panel display system having a front viewing surface, comprising:
a black matrix having a black matrix edge substantially perpendicular to the front viewing surface;
an electrode having an electrode edge substantially perpendicular to the front viewing surface; and
a color filter having a color filter edge substantially perpendicular to the front viewing surface,
wherein the color filter is disposed between the black matrix and the electrode, and at least one of the black matrix edge, the color filter edge, and the electrode edge includes an edge texture configured to direct reflection-mode diffraction light in two or more azimuthal directions, the reflection-mode diffraction light caused by light emitted from a point light source incident on the flat panel display system.

14. The flat panel display system of claim 15, wherein the edge texture has a profile selected from at least one of a fractal profile, a discontinuous curved profile, a continuous curved profile, a piecewise linear profile, a random profile, a non-linear profile, and a profile configured to direct the reflection-mode diffraction light in two or more azimuthal directions.

15. The flat panel display system of claim 14, wherein the black matrix includes a black matrix major surface substantially parallel to the front viewing surface and at least a portion of the black matrix major surface includes the edge texture.

16. The flat panel display system of claim 14, wherein the electrode includes an electrode major surface substantially parallel to the front viewing surface and at least a portion of the electrode major surface includes the edge texture.

17. The flat panel display system of claim 14, wherein the color filter includes a color filter major surface substantially parallel to the front viewing surface and at least a portion of the color filter major surface includes the edge texture.

18. The flat panel display system of claim 13, wherein the black matrix comprises a material exhibiting low reflectance and substantial opacity.

19. The flat panel display system of claim 13, wherein the color filter comprises an optically transparent material.

20. The flat panel display system of claim 13, wherein the black matrix, the electrode, and the color filter comprise a display element and the flat panel display system is comprised of a plurality of display elements.

* * * * *